E. R. SHEPARD.
NUT-LOCK.
No. 191,079. Patented May 22, 1877.
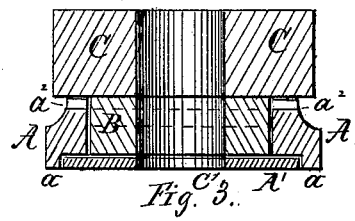
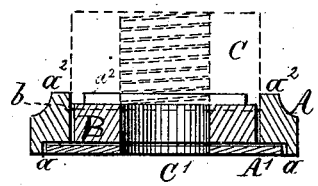
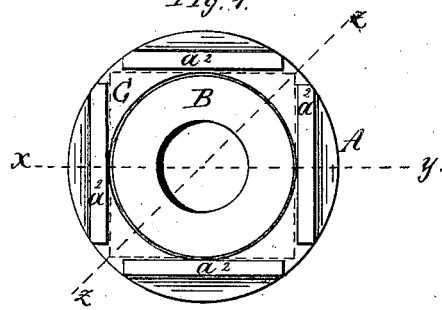
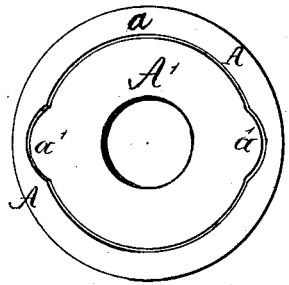
Witnesses
Henry Orth
H. H. Bliss
Inventor
Edwin R Shepard
by H. H. Doubleday att

UNITED STATES PATENT OFFICE.

EDWIN R. SHEPARD, OF PHILADELPHIA, PENNSYLVANIA.

IMPROVEMENT IN NUT-LOCKS.

Specification forming part of Letters Patent No. 191,079, dated May 22, 1877; application filed October 2, 1876.

*To all whom it may concern:*

Be it known that I, EDWIN R. SHEPARD, of Philadelphia, in the county of Philadelphia and State of Pennsylvania, have invented certain new and useful Improvements in Nut-Locks; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1 is a top or plan view. Fig. 2 is a bottom view; and Fig. 3 is a vertical section, taken on line $x\,y$, Fig. 2. Fig. 4 is a vertical section, taken on line $z\,z$, Fig. 2.

It has been ascertained from experience that rubber, when subjected to a heavy pressure, for even a short time, loses its elasticity to such an extent as to nearly or quite destroy its value in a locking-nut intended for use upon the fish-plates which connect the ends of railroad-rails when rubber washers or packing is employed to prevent the nuts from backing off.

This invention is intended to remedy the above-recited difficulty, by so constructing the metal washer that the nut shall have, when screwed up to place, a firm and positive bearing upon the washer, while at the same time a central elastic washer or core is sufficiently compressed to insure that it (the elastic washer) shall be pressed closely against, and into, the thread of the screw-bolt, and against the nut, as will be hereinafter fully explained.

A A' is the outer metal washer, round in form, and provided with a recess or socket to receive the central elastic washer B, to be hereinafter more fully described.

The bottom A' of the metal washer is cast separately from the body A, which has a groove, channel, or rabbet in its lower edge, as at $a$, Fig. 3, to receive the outer edge of the bottom, which is irregular in its outline, as at $a^1$, to insure that it (the bottom) shall turn with the part A. When preferred, the bottom may be of octagon or other many-sided form.

The upper face of the part A is provided with four ribs, $a^2$, forming a socket to receive the nut; and as this socket is open at the corners, a larger nut can be used than there could be were these ribs made to connect with each other.

Thus the nut has a broad seat at each corner upon the metal washer, in addition to its bearing upon the central elastic washer. This elastic washer fits closely within the recess formed centrally in the metal washer, as shown plainly in Fig. 3, and is thicker than this recess is deep, as will be seen by an examination of Fig. 3, in which the upper edge of the recess is indicated by the dotted line $b$.

Thus, whenever the nut is screwed down to its bearings upon the metal washer, the elastic washer B is compressed firmly within the recess against the bolt C', and against the movable bottom A' of the washer.

As this loose bottom is not compressed by the nut, except through the medium of the elastic washer, it (the bottom) is free to conform to the surface of the fish-plate, rail, or chair, and hence maintains a constant pressure upon all parts of the under surface of the nut with which it comes in contact, even though it be but slightly compressed, and hence is much more effective in preventing a backward movement of the nut than is any prior construction of parts.

For convenience in handling and application to rails, I prefer to secure the loose bottom A' to the lower side of the elastic washer by means of an adhesive compound of rubber and alcohol, or some equivalent thereof.

From the above description it will be seen that my washer combines the advantages of a firm positive bearing for the nut, with an elastic washer to prevent the nut from backing off, while at the same time the elastic washer is protected from such a degree of compression as will destroy its elasticity, such injurious result to its elasticity ordinarily resulting from the immense pressure which similar washers are compelled to bear when the nuts have no other support.

What I claim is—

A nut-locking device consisting of a metal washer, A, provided with a socket to receive the nut C, and having seats to receive and support the corners of the nut, and with a central recess for the elastic washer, in combination with an elastic washer, B, arranged in said recess, and of such thickness that it may be compressed by the screwing up of the nut, substantially as set forth.

In testimony that I claim the foregoing as my own I affix my signature in presence of two witnesses.

EDWIN R. SHEPARD.

Witnesses:
 THOS. B. ALLEN,
 WM. M. MERVINE.